(12) United States Patent
Guwala

(10) Patent No.: US 10,878,469 B2
(45) Date of Patent: *Dec. 29, 2020

(54) DIGITAL PROOF OF DELIVERY

(71) Applicant: PAYPAL, INC., San Jose, CA (US)

(72) Inventor: Rajasekhara Reddy Guwala, Chennai (IN)

(73) Assignee: PayPal, Inc., San Jose, CA (US)

(*) Notice: Subject to any disclaimer, the term of this patent is extended or adjusted under 35 U.S.C. 154(b) by 153 days.

This patent is subject to a terminal disclaimer.

(21) Appl. No.: 16/154,683

(22) Filed: Oct. 8, 2018

(65) Prior Publication Data

US 2019/0139111 A1  May 9, 2019

Related U.S. Application Data

(63) Continuation of application No. 14/753,769, filed on Jun. 29, 2015, now Pat. No. 10,096,048, which is a continuation of application No. 13/435,209, filed on Mar. 30, 2012, now Pat. No. 9,070,153.

(51) Int. Cl.
*G06Q 30/06* (2012.01)
*G06Q 20/12* (2012.01)

(52) U.S. Cl.
CPC ....... *G06Q 30/0609* (2013.01); *G06Q 20/123* (2013.01); *G06Q 30/06* (2013.01); *G06Q 30/0613* (2013.01); *G06Q 30/0619* (2013.01); *G06F 2221/2137* (2013.01)

(58) Field of Classification Search
CPC .......... G06Q 30/0609; G06Q 30/0613; G06Q 30/06; G06Q 30/0619; G06Q 20/123; G06F 21/10; G06F 2221/0795; G06F 2221/2137; H04L 2463/102

USPC ............... 705/26.1, 26.35, 26.41, 26.44
See application file for complete search history.

(56) References Cited

U.S. PATENT DOCUMENTS

| | | | |
|---|---|---|---|
| 8,479,145 B2 * | 7/2013 | Swaminathan | G06F 8/36 717/101 |
| 2004/0143652 A1 * | 7/2004 | Grannan | H04L 67/14 709/223 |
| 2005/0108107 A1 * | 5/2005 | Grayson | G06Q 30/0258 705/26.1 |

(Continued)

FOREIGN PATENT DOCUMENTS

WO   WO-2007083306 A2 *  7/2007   ......... G06Q 30/0601

*Primary Examiner* — Yogesh C Garg
(74) *Attorney, Agent, or Firm* — Haynes and Boone LLP

(57) ABSTRACT

A digital proof of delivery for digital goods items purchased online includes methods and systems for authenticating online purchases for helping to prevent and mitigate fraud. A unique download identification (ID) is created and associated with the digital goods download and purchase. Additionally, third parties may readily be allowed to view the download status of a digital goods item by providing the unique download identification (ID) of the item, which may be useful for aiding third party fraud investigations. In response to an item of digital goods purchased by a customer for download from a merchant having reached a specific stage of downloading, but the download is not complete, download is suspended and a dialog box is sent over a network for presentation to a customer, and, in response to a confirmation received via the dialog box, the download is completed with a download ID that is unique to the completed download.

20 Claims, 4 Drawing Sheets

(56) References Cited

U.S. PATENT DOCUMENTS

| | | |
|---|---|---|
| 2008/0097898 A1 | 4/2008 | Hibbert et al. |
| 2009/0094321 A1* | 4/2009 | Ueda .................. H04L 63/0428 709/203 |
| 2011/0119664 A1* | 5/2011 | Kimura ..................... G06F 8/60 717/173 |
| 2011/0295689 A1 | 12/2011 | Brady |
| 2012/0047024 A1 | 2/2012 | Urban et al. |
| 2012/0159325 A1 | 6/2012 | Stevens et al. |
| 2012/0221396 A1 | 8/2012 | Eglen et al. |
| 2013/0159701 A1 | 6/2013 | Phillips, II et al. |

\* cited by examiner

DIGITAL PROOF OF DELIVERY

CROSS REFERENCE TO RELATED APPLICATIONS

This application is a continuation of and claims benefit of priority of U.S. patent application Ser. No. 14/753,769, filed Jun. 29, 2015 and U.S. patent application Ser. No. 13/435, 209, filed Mar. 30, 2012, now U.S. Pat. No. 9,070,153 issued Jun. 30, 2015, both of which are incorporated by reference in their entirety.

BACKGROUND

Technical Field

Embodiments of the present invention generally relate to methods and systems for facilitating e-commerce and, more particularly, for enabling merchants to provide proof of delivery of digital goods items for preventing or reducing fraud.

Related Art

In today's media market, it is not at all uncommon to sell and deliver digital content such as files, software, art, photographs, music, and movies through a number of electronic sources. This is usually referred to as digital e-commerce or digital download delivery. Digital goods is a general term that may be used in e-commerce to refer to any goods that are stored, delivered, or used electronically and may be used in a variety of industries, such as gaming, online content, and premium video. Examples of digital goods include e-books, music files, games, video, news articles, media content, software, digital images, website templates, manuals in electronic format, or any item which can be electronically stored in a file or multiple files. People also purchase digital goods in all sorts of online applications ranging from social networking apps (applications) and games to massively multiplayer online games. Some of the most popular items of these digital goods include virtual goods such as virtual money and virtual weapons. Free-to-play games, where one can start playing for free and then buy items in the game as one needs them, also account for a large amount of virtual goods transactions.

Digital goods may be delivered electronically to the consumer through e-mail, for example, or by download from the Internet. Usually when purchasing digital goods online, after the merchant has received payment the merchant may provide the digital goods item as an e-mail attachment or may provide the purchaser with a secure link where the purchaser can download the item.

SUMMARY

According to one or more embodiments of the present invention, methods and systems for digital proof of delivery facilitate authenticating online purchases for helping to prevent and mitigate fraud on purchase of digital goods items. With the aid of one or more embodiments, merchants can authenticate the purchase when, for example, a customer makes a claim for an "item not received for digital goods purchase". Additionally, third parties may be readily allowed to view the download status of a digital goods item by providing a unique download identification (ID) of the item. The unique download identification (ID) of the item also may be useful for aiding third party fraud investigations.

In one or more embodiments, a system includes: a processor for communication over a network with a customer and a merchant, the processor executing a process that provides an intermediary between the customer and the merchant, in which, in response to an item of digital goods purchased by the customer for download from the merchant having reached a pre-determined stage of downloading, and the download of the item of digital goods is not complete, the processor suspends the download and communicates a dialog box over the network for presentation to the customer, and in which, in response to a confirmation received via the dialog box, the processor completes the download of the item of digital goods and provides a download ID that is unique to the completed download.

In another embodiment, a method includes: in response to a download over a network of an item of digital goods purchased by a customer for download from a merchant having reached a pre-determined stage, and the download of the item of digital goods is not complete, suspending the download and communicating a dialog box over the network for presentation to the customer; and in response to a confirmation received via the dialog box, completing the download of the item of digital goods and providing a download ID that is unique to the completed download.

In a further embodiment, a computer program product comprises a non-transitory computer readable medium having computer readable and executable code for instructing a processor to perform a method that includes: in response to a download over a network of an item of digital goods purchased by a customer for download from a merchant having reached a pre-determined stage, and the download of the item of digital goods is not complete, suspending the download and communicating a dialog box over the network for presentation to the customer; and in response to a confirmation received via the dialog box, completing the download of the item of digital goods and providing a download ID that is unique to the completed download.

DETAILED DESCRIPTION

Embodiments of the present invention relate to providing solutions to help merchants provide proof of delivery of digital goods items for preventing and reducing fraud. In one embodiment, a customer may buy a digital goods item from a merchant website; then, once the merchant receives payment through, for example, a payment gateway, the merchant may provide a secure connection to deliver the digital goods to the customer from a digital goods store (which may be the same or separate from the merchant website). A unique download identification (ID) is created and associated with the digital goods download and purchase. With this solution, merchants can authenticate the purchase when, for example, a customer files a charge back for an "item not received for digital goods purchase". Additionally, any third party can view the download status by providing the unique download identification (ID), which may aid third party fraud investigation.

In one example of an embodiment, the parties or entities involved when a customer (also referred to as a "user" of the system or services) purchases some digital goods item from a merchant website may include: 1) a merchant website; 2) a payment gateway; and 3) a store that sells digital goods (e.g., where the actual digital item resides). The payment gateway may include an online payment service and may be a service provided by a financial service provider (FSP)—such as PayPal, Inc. of San Jose, Calif.—in which a user of the service may have an account with the FSP (referred to as an "FSP account). In one or more embodiments, various mechanisms may be provided for sending digital goods including, for example, using the sender's FSP account and a sender's digital goods "locker" provided by the FSP, using a receiver's digital goods locker provided by the FSP, using email, or providing for the receiver to receive the digital goods directly from the seller, e.g., a merchant or a digital goods store. Once the user (customer) decides to purchase some digital goods item on the merchant website then the user may be asked to pay the amount specified as the price of the particular digital goods item. The merchant website may establish a secure connection to the payment gateway by which to receive proceeds for the purchase of the digital goods item. The gateway may, for example, provide a channel for payment from the customer to the merchant or to the store that sells the item. Once the merchant website receives from the payment gateway an indication of payment success, then the merchant contacts the store or stores to provide a secure connection (e.g., a link) for delivering the digital goods to the user. For security, the link for the secure connection may, for example, be available to the user on a time limited basis.

Figure 1:
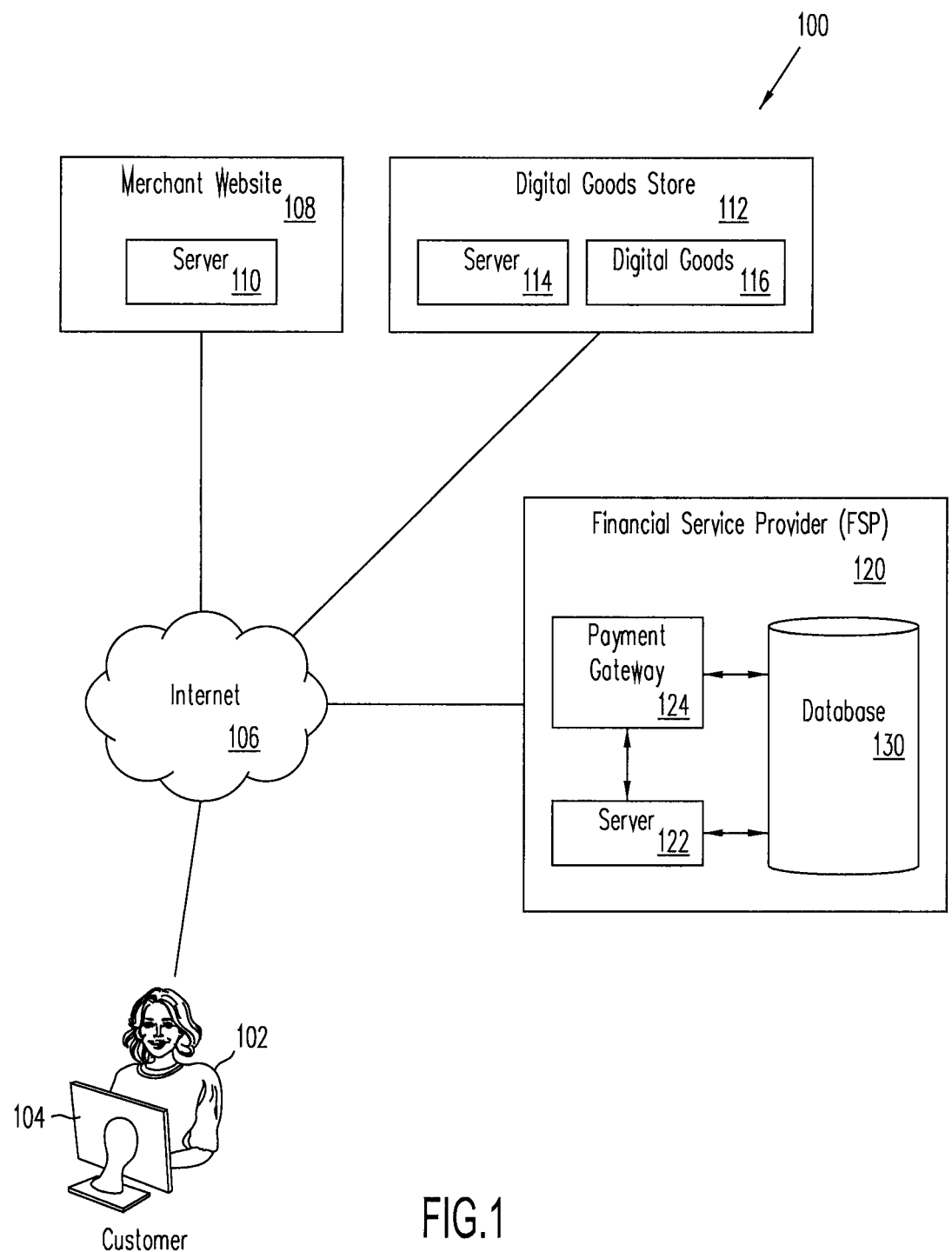
FIG. 1 is a system diagram illustrating a system for digital goods commerce in accordance with an embodiment of the present invention.

FIG. 1 illustrates a system 100 for digital goods commerce according to one embodiment. A customer 102 (also referred to as a user of FSP services) may communicate via a device 104 (e.g., a computer, cell phone, computing tablet, or other consumer electronic device) with financial service provider 120 via a network 106, such as the Internet. Customer 102 may also communicate via network 106 with a merchant website 108 that may be a seller of digital goods (e.g., digital goods 116). Merchant website 108 may sell digital goods online and may communicate with customer 102, for example, by operating a server 110 (e.g., a computer processor) that presents a website for selling digital goods, the server 110 responding to client devices (e.g., device 104) by communicating over network 106. Merchant website 108 may also communicate (for example, using server 110) with FSP 120 through FSP server 122 over network 106.

For example, merchant website 108 may communicate with FSP 120 in the course of various services offered by FSP 120 to merchant website 108, such as payment intermediary (referred to as payment gateway 124) between customers (e.g., customer 102) of merchant website 108 and merchant website 108 itself. Similarly, a digital goods store 112 may communicate using a server processor 114 over network 106 with any of customer 102, merchant website 108, and FSP 120, each of which also may communicate with digital goods store 112 using network 106 via server 114. FSP server 122 may execute various application programming interfaces (APIs) that may enable various different types of relationships between FSP 120 and the different parties shown in FIG. 1. For example, merchant website 108 may use an API that allows it to offer sale of goods in which customers are allowed to make payment through FSP 120, while customer 102 may have an account with FSP 120, managed by a different API, that allows customer 102 to use the FSP 120 for making payments to sellers that allow use of payment gateway 124 of FSP 120 as a payment intermediary. Also as shown in FIG. 1, FSP 120 may provide electronic data storage in the form of database 130. Database 130 may be used to keep track of user's accounts with FSP 120, merchant's accounts with FSP 120, and transactions between customers, merchants, and stores including payments between the various entities, for example.

Figure 2:
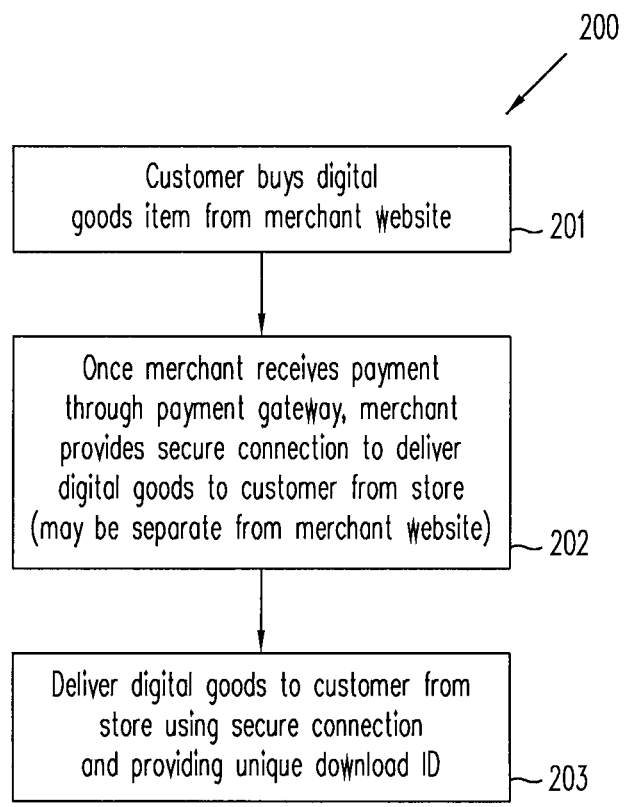
FIG. 2 is a flow chart illustrating a method for digital goods commerce in accordance with an embodiment.

FIG. 2 illustrates a method 200, according to one embodiment, showing a process flow for one or more digital goods transactions involving sending and receiving digital goods with digital proof of delivery in a system such as system 100 for digital goods commerce.

At step 201, a user of services provided by FSP 120, such as customer 102 who may have an FSP account with FSP 120, may be shopping online, for example, at a merchant website 108 of a merchant who sells digital goods. The user 102 may decide whether or not to buy a particular item of digital goods (e.g., digital goods 116), and if so, the customer (user) 102 may buy the digital goods item 116 from the merchant website 108.

At step 202, FSP 120 may provide a service to the user (e.g., customer 102) that allows the user to buy the item from the merchant website. For example, FSP 120 may provide a mouse click button on the merchant website 108 that allows the user to pay the merchant website 108 from the user's account with the FSP 120 via the payment gateway 124. The FSP 1210 may also provide a service to the merchant website 108 that allows the merchant website 108 to receive payment directly from the FSP 120 on behalf of customer 102 without needing to know any financial information of customer 102. Once the merchant website 108 receives payment for digital goods 116 through the payment gateway 124, the merchant website 108 may provide a secure connection to deliver digital goods 116 to customer 102 from digital goods store 112. Digital goods store 112 may be separate from merchant website 108, and merchant website 108 may provide a payment to digital goods store 112 for the digital goods 116. In other examples, digital goods store 112 and merchant website 108 may be commonly owned, may be parts of the same entity, or may be the same entity.

At step 203, the digital goods 116 may be delivered to customer 102 from digital goods store 112 using the secure connection provided, for example, by the merchant website 108. A secure connection may also be provided, for example, by the FSP 120. Delivery of the item of digital goods 116 may also include a unique download identification (ID) that corresponds only to this particular download, e.g., the combination of the digital goods item downloaded, the IP address to which the item was downloaded, the store or merchant that provided the download, and the time of the download. For example, customer 102 may download the digital goods 116 directly from digital goods store 112 using the secure link provided by merchant website 108 and that particular download occurrence may have a unique ID associated with it that identifies that occurrence and only that occurrence and may be stored (e.g., using an electronic data storage device in communication with the processor on which the unique ID is created) by digital goods store 112 for future reference by, for example, digital store 112, FSP 120, customer 102, or other party of interest. In another example, merchant website 108 may download the digital goods 116 from the digital goods store using a secure connection, then provide the digital goods to the customer 102 over the secure link, and keep a record of the unique download ID.

Figure 3:
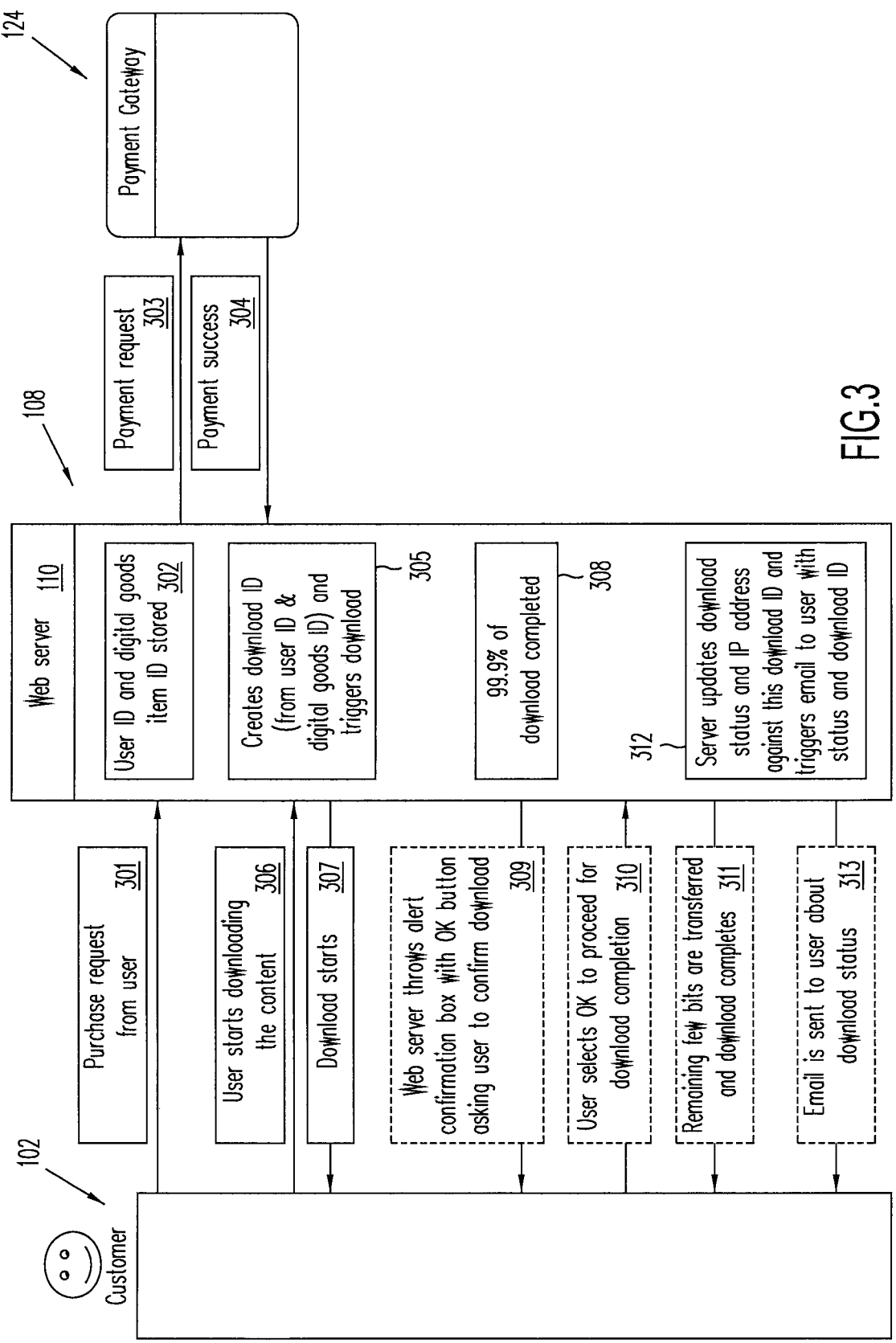
FIG. 3 is a flow diagram illustrating flows of information, goods, and payments for digital goods commerce in accordance with an embodiment.

FIG. 3 sequentially illustrates flows of information, goods, and payments that may occur between a customer, a merchant, and a financial service provider for digital goods commerce in accordance with an embodiment. At purchase request 301, for example, a merchant (e.g., merchant website 108 or digital goods store 112) may receive a purchase request 301 from a customer (e.g., customer or user 102). At storage 302, a web server (e.g., web server 110 of merchant website 108 or server 114 of digital goods store 112) may store a user ID for customer 102 and a digital goods item ID for the digital goods 116 item bought. The merchant website 108 may, for example, store the user ID and digital goods item ID in an electronic information storage or hardware memory accessible by server processor 110; the user ID and digital goods item ID may also be stored in database 130 by FSP 120. A payment request 303 may then be sent to the payment gateway 124.

Payment gateway 124 may process the payment request 303. Examples of processing include checking the customer's account, checking the merchant's account, transferring payments between accounts, and declining payment if funds are not available. Thus payment success may or may not be achieved. If payment success is achieved, payment success 304 may be sent to merchant 108, indicating that payment success has been achieved.

Once the merchant 108 receives payment success 304 (e.g., a payment success message) from the payment gateway 124, then the merchant 108 (e.g., web server 110) may create a unique download ID (that is unique for each download 305, for example, a random number) from the user ID and digital goods item ID. For example, the unique download ID may be an identifier that uniquely corresponds to the combination of an identification of the digital goods item purchased, an identification of the customer, an identification of a device to which the digital goods item is download, and an identification of the particular instance of downloading the digital goods item. Once the unique download ID has been created and stored, the server processor 110 (operated by, e.g., merchant 108) may trigger the download 305.

The uniqueness of the download ID for each download 305 may enable providing a proof of delivery for each download 305, for example, by allowing each item of downloaded digital goods to be tracked, identified and accounted for. Triggering the download 305 may include, for example, contacting the digital goods store 112 to provide a secure connection (e.g., a link) for delivering the digital goods 116 to the user. A secure link may be encrypted, for example, and may be available to the user 102 on a time limited basis. Triggering the download 305 may also include, for example, providing a mouse click button on the merchant website 108, by which customer 102 can start the download 305 when the customer is ready. At customer start 306, the customer 102 may start the download 305, and at download start 307, the secure download 305 having the unique download ID corresponding to the user ID, the digital goods item ID, and the particular download 305 itself may begin over the secure connection (e.g., link) provided by the merchant 108 to the customer 102.

When download 305 has reached a pre-determined stage such as being nearly complete, e.g., download nearly complete event 308, web server 110 may initiate a series of events. Download nearly complete event 308 may use any desired threshold for determining that download 305 has reached the pre-determined stage, e.g., nearly complete. In the example illustrated in FIG. 3, download nearly complete event 308 may be triggered when the download 305 is 99.9% complete, as shown; other criteria for a threshold, however, could be defined beforehand, such as 50% completion of download 305, and the threshold could, for example, be based on the size (e.g., data bytes) of the digital goods item 116 or the estimated time to complete at the data rate of the secure link provided by the merchant 108 to the customer 102.

Download nearly complete event 308 may initiate dialog box 309 in which merchant web server 110 throws (e.g., using a java script "throw" statement) a confirmation dialog box to user 102 asking user 102 to confirm the download. 305. The confirmation dialog box can be thrown, for example, using java script which may reside in web server 110 and may be monitoring the download 305. In response to dialog box 309, the user 102 may select "OK" to proceed for download completion, for example, by clicking on a confirmation button provided in the confirmation dialog box. If response 310 is a confirmation (e.g., "OK"), download completion 311 may proceed. If response 310 is not a confirmation, download completion 311 may be aborted.

At confirmation 312, the server 110 may update the download 305 status and IP address against the unique download ID for download 305 (for example, update database entries keyed to the unique download ID for download 305 in a database kept by merchant website 108 or in database 130). Also, at confirmation 312, the server 110 may trigger an email with the download 305 status and unique download ID to be sent to user 102. Email 313 may then be sent to user 102 about the user's download request status, and the email may provide the unique download ID for future reference by the user. For example, the user 102 may wish to check the status of download 305 on the merchant web site 108. In addition, the unique download ID stored at storage 302 may be used by the download provider (e.g., merchant website 108, digital goods store 112, or FSP 120) for various purposes such as showing the information to third parties or customers when customers file charge backs (e.g., return or refund for guaranteed items).

Figure 4:
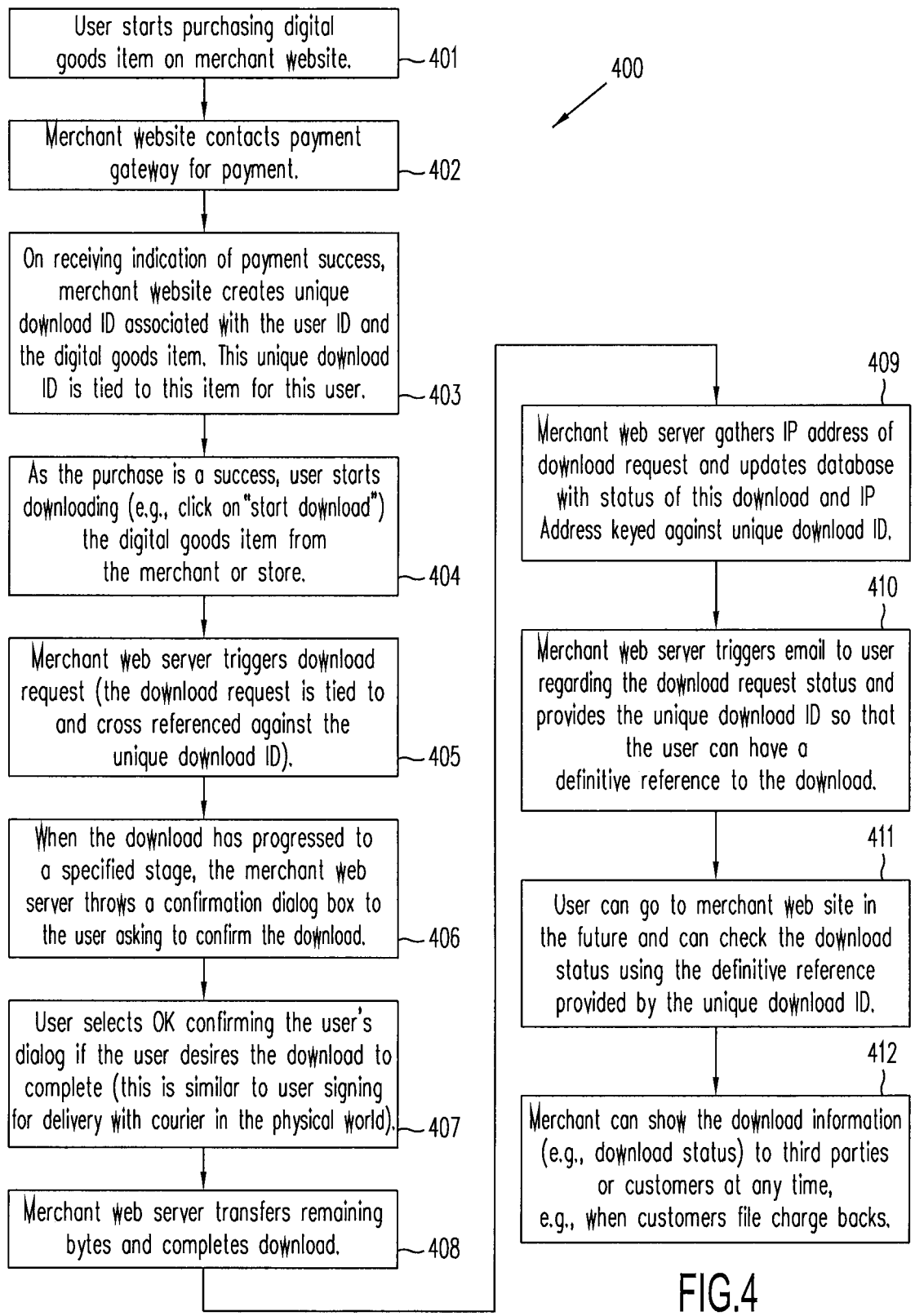
FIG. 4 is a flow chart illustrating a method for digital goods commerce in accordance with an embodiment.

FIG. 4 is a flow chart illustrating a method 400 for digital goods commerce in accordance with an embodiment.

At step 401 of method 400, a user (e.g., customer 102) may start purchasing a digital goods item (e.g., digital goods 116) on a merchant website (e.g., merchant website 108).

At step 402, the merchant website may contact a payment gateway (e.g., payment gateway 124 of FSP 120) for payment.

At step 403, once the payment is successful (e.g., a payment success message is received from the FSP 120), the merchant website may create a unique download ID associated with the user (customer) ID and the digital goods item. This unique download ID may be tied to this item for this user, for example, by cross-referencing in a database into which the unique download ID is stored. The download ID may uniquely correspond, for example, to a combination of factors, such as an identification of the digital goods item purchased, an identification of the customer, an identification of a device to which the digital goods item is download, and an identification of the particular instance (e.g., time-stamp) of downloading the digital goods item At step 404, as the purchase is a success, the user may start downloading the digital goods item from the item provider, e.g., merchant website 108 or digital goods store 112. For example, the user may click on a "start download" button provided on the merchant's webpage.

At step 405, merchant web server (e.g., web server 110) may trigger a download request (this download request may be tied to the unique download ID; for example, the download request may correspond to and be cross-referenced to the unique download ID at storage 302). The download request, for example, may be sent to the digital goods store 112 from merchant website 108 and may contain information sufficient to provide a secure download to customer 102.

At step 406, when the download reaches a certain stage of completion, e.g., progresses to 99.9%, the merchant web server may throw a confirmation dialog box to the user asking to confirm the download. The confirmation dialog box can be thrown, for example, using a java script throw statement; java script may reside in the web server (e.g., web server 110, web server 114, or web server 122) monitoring the download corresponding to the download request.

At step 407, if the user desires the download to complete, the user may select "OK" in the confirmation dialog box, confirming the user's dialog (this may be regarded as being similar to the user physically signing a courier receipt after a delivery in the physical world). At step 408, the merchant web server may transfer the remaining bytes and complete the download.

At step 409, the merchant web server may gather the IP address of the download request (e.g., IP address of customer 102) and may update a database (e.g., merchant's database, digital goods store database, or FSP database 130) with the status of the download and the IP address, cross-referenced against the unique download ID.

At step 410, the merchant web server may trigger an email to the user about the user's download request status and provide the unique download ID so that the user can definitively refer to the particular download by its unique download ID. At step 411, for example, having the unique download ID for future reference, the user can go to the merchant web site and, using the definitive reference provided by the unique download ID, can check the download status.

At step 412, the merchant can show relevant information (e.g., download status) to third parties or customers when customers file charge backs. With the unique download ID used as a cross-reference, for example, merchants can authenticate when customers file charge backs, e.g., claims for "item not received on order for digital goods item". Also, in one or more embodiments, any third party can view the download status by providing the unique download ID, and the unique download ID can be crucial for third party fraud investigation.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
      creating a download identification (ID) unique to a download occurrence of digital goods by a customer device over a network;
      monitoring a download progress of the download occurrence;
      in response to detecting that the download occurrence has reached a predetermined stage of completion based on the monitoring, suspending the download occurrence and transmitting, to the customer device, a confirmation request for completing the download occurrence;
      in response to receiving a confirmation for completing the download occurrence from the customer device, resuming the download occurrence and indicating, via the download ID, a completion of the download occurrence;
      in response to receiving, from a user device, an action request comprising the download ID, determining characteristics of the download occurrence based on the download ID, and
      performing an action referenced by the action request based on the characteristics of the download occurrence.

2. The system of claim 1, wherein the performing the action comprises providing a status of the download occurrence to the user device.

3. The system of claim 1, wherein the download occurrence is associated with a unique instance download of the digital goods by the customer device over a secure connection between a merchant device providing the digital goods and the customer device.

4. The system of claim 1, wherein the operations further comprise:
   storing the download ID and the characteristics of the download occurrence on an electronic data storage device; and
   in response to receiving the action request, accessing the electronic data storage device to obtain the characteristics for the download ID.

5. The system of claim 1, wherein the action request is a chargeback request for a purchase of the digital goods, and wherein the operations further comprise:
   determining that the purchase is associated with the download ID;
   retrieving a download status of the download occurrence based on the download ID; and
   denying the action request based on the download status.

6. The system of claim 1, wherein the transmitting the confirmation request comprises sending instructions for displaying a dialog box on the customer device, the dialog box for prompting a confirmation selection.

7. The system of claim 1, wherein the download ID is an electronically created unique number based in part on a random number.

8. The system of claim 1, wherein the creating the download ID comprises creating an identifier that corresponds to a combination of at least two or more of:
   an identification of the digital goods,
   an IP address associated with the customer device,
   an identification of a merchant that provides the digital goods for download, or
   an identification of a customer of the customer device.

9. The system of claim 1, wherein the operations further comprise storing the download ID and the characteristics of the download occurrence in at least one of a database of a merchant, a digital goods store database, or a service provider database.

10. The system of claim 1, wherein the operations further comprise updating a database record associated with the download ID with a status of the download occurrence and an IP address of the customer device.

11. The system of claim 1, wherein the download occurrence is associated with a unique instance download of the digital goods by the customer device over a secure connection between a merchant device providing the digital goods and the customer device.

12. A method for using download identifications for processing downloads of digital goods, the method comprising:
   creating a download identification (ID) unique to a download occurrence of digital goods by a device of a customer over a network;
   detecting that the download occurrence has reached a predetermined stage of completion;
   in response to detecting that the download occurrence has reached the predetermined stage of completion, interrupting the download occurrence and transmitting, to the device, a confirmation request for completing the download occurrence;
   completing the download occurrence based on a confirmation received from the device;
   in response to receiving, from a user device, an action request comprising the download ID, determining characteristics of the download occurrence based on the download ID; and
   performing an action referenced by the action request based on the characteristics of the download occurrence.

13. The method of claim 12, wherein the performing the action comprises providing a status of the download occurrence to the user device.

14. The method of claim 12, wherein the download occurrence is associated with a unique instance download of the digital goods by the device over a secure connection between a merchant device providing the digital goods and the device.

15. The method of claim 12, further comprising:
storing the download ID and the characteristics of the download occurrence on an electronic data storage device; and
in response to receiving the action request, accessing the electronic data storage device to obtain the characteristics using the download ID.

16. The method of claim 12, wherein the action request comprises a chargeback request for a purchase of the digital goods, and wherein the method further comprises:
determining that the purchase is associated with the download ID;
retrieving a download status of the download occurrence; and
denying the action request based on the download status.

17. The method of claim 12, wherein the transmitting the confirmation request comprises sending instructions for displaying a dialog box on the device, the dialog box for prompting a confirmation selection.

18. The method of claim 12, further comprising updating a database record associated with the download ID with a status of the download occurrence and an IP address of the device.

19. A non-transitory machine-readable medium having stored thereon machine-readable instructions executable to cause a machine to perform operations comprising:

creating a download identification (ID) unique to a download occurrence of digital goods by a customer device over a network;
monitoring a download progress of the download occurrence;
in response to detecting that the download occurrence has reached a predetermined stage of completion based on the monitoring, suspending the download occurrence and transmitting, to the customer device, a confirmation request for completing the download occurrence;
in response to receiving a confirmation from the customer device, resuming the download occurrence and indicating, via the download ID, a completion of the download occurrence;
in response to receiving, from a user device, an action request comprising the download ID, determining characteristics of the download occurrence based on the download ID; and
performing an action referenced by the action request based on the characteristics of the download occurrence.

20. The non-transitory machine-readable medium of claim 19, wherein the performing the action comprises providing a status of the download occurrence to the user device.

* * * * *